United States Patent [19]

Del Pesco, Sr.

[11] 3,955,884
[45] May 11, 1976

[54] MAGNIFYING LENS HOLDER ASSEMBLY

[75] Inventor: Andrew Del Pesco, Sr., East Killingly, Conn.

[73] Assignee: Del Pesco Systems, Inc., East Killingly, Conn.

[22] Filed: Nov. 11, 1974

[21] Appl. No.: 522,885

[52] U.S. Cl................................ 350/248; 350/239; 350/242; 350/250; 350/251
[51] Int. Cl.².......................................... G02B 7/02
[58] Field of Search.................. 33/107 R; 248/474; 350/238–240, 242–246, 248, 250–252

[56] References Cited
UNITED STATES PATENTS

| 373,597 | 11/1887 | McMicken | 33/107 R |
|---|---|---|---|
| 1,884,968 | 10/1932 | Bloch | 350/242 |
| 1,989,454 | 1/1935 | Koster | 350/239 X |
| 2,100,239 | 11/1937 | Carlton | 350/248 |
| 2,746,347 | 5/1956 | Gaire | 350/242 |
| 3,428,286 | 2/1969 | Del Pesco | 248/474 |

Primary Examiner—John K. Corbin
Assistant Examiner—F. L. Evans
Attorney, Agent, or Firm—Salter & Michaelson

[57] ABSTRACT

A magnifying lens holder assembly comprising a frame having a magnifying lens mounted therein, said frame being pivotally connected to an elongated arm whereby the frame may fold against said arm, and a case pivotally receiving said arm, whereby said arm, with the frame folded thereagainst, may be swung into said case to be enclosed thereby, said case having opposed resilient portions for receiving a user's finger, a pen, a flashlight or the like, a pivotally mounted supporting member for maintaining said case in upstanding position on a flat supporting surface, a finger clamp for slidingly receiving a card or the like, and clip means for enabling the case to be selectively attached to a wearer's pocket or to the temple bar of eyeglasses.

9 Claims, 11 Drawing Figures

MAGNIFYING LENS HOLDER ASSEMBLY

BACKGROUND AND SUMMARY OF THE INVENTION

It has been found desirable to provide a holder for a magnifying lens which permits the lens to be used in a variety of different positions and which carries means for permitting the assembly to be releasably attached to a user's finger, or to the temple bar of a user's eyeglasses.

Magnifying lens holder assemblies are not new in the art, and an example of a prior assembly is shown in applicant's prior U.S. Pat. No. 3,428,286 dated Feb. 18, 1969. Although the assembly shown in said patent permits the magnifying lens to assume a variety of different positions in use, the assembly does not readily lend itself to being carried in one's pocket.

It is therefore a primary object of the present invention to provide a magnifying lens holder assembly whereby when not in use the assembly may be compactly folded within a case member that forms a part of the assembly so as to be easily carried within one's pocket or, if preferred, so as to be clipped to one's pocket for easy carrying.

In addition to having clip means for enabling the case to be releasably secured to one's pocket, said clip means also have the capability of permitting the case to be releasably attached to the temple bar of a user's eyeglasses. In addition, the case has integral gripping means for permitting the case to be easily attached to a user's finger, it being understood that when the case is attached to either a user's finger or to the temple bar of eyeglasses, the magnifying lens may be manipulated so as to assume the desired position of use with respect to the user's finger or eyeglasses.

It is also a feature of the present invention to provide the carrying case with finger means which enable a flat card, slide or the like to be frictionally engaged for proper positioning so as to be viewed through the magnifying lens.

The case of the present invention further comprises a pivotally mounted supporting member which may be swung to an operative supporting position in order to permit the case to assume an upstanding position on a flat surface without being held.

A further feature of the present invention is the fact that the assembly is constructed of molded plastic parts which lend themselves to quick and easy assembly whereby the completed unit is extremely lightweight, is economically feasible to manufacture, but nevertheless is durable and versatile in use.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 6 is a sectional view showing the clip member which forms a part of the present invention in engagement with a wire temple bar;

DESCRIPTION OF THE INVENTION

Figure 1:
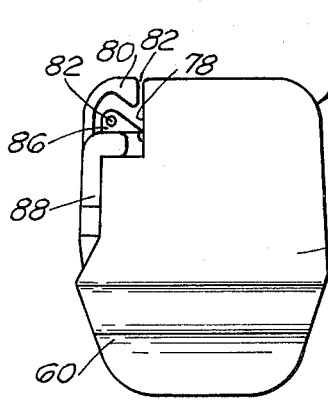
FIG. 1 is a front side elevational view of the holder of the present invention.

Referring now to the drawings, a magnifying lens holder assembly embodying the present invention is shown generally at 10. The assembly 10 comprises a case 12 made up of two halves 14, 16, each preferably molded of any suitable plastic material, such as styrene or the like. As will be seen most clearly in FIG. 9, the half 14 comprises a side wall 18 having an integral top wall 20, while the half 16 comprises side wall 22 having integral top wall 24. The halves 14 and 16 have suitable internal bosses (not shown) for permitting said halves to be secured together, such as by screws 26. When secured together, the halves 14 and 16 mate with each other to define the casing 12, it being understood that the top walls 20 and 24 cooperate to form the top wall of the casing, while side walls 18, 22 are spaced from each other to define a housing or enclosure 28.

Figure 2:
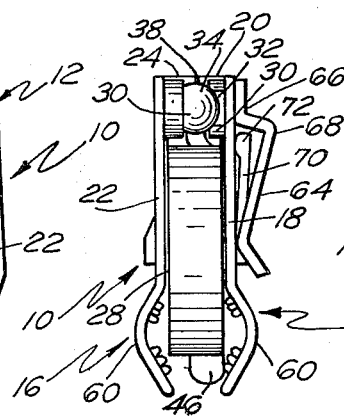
FIG. 2 is an end elevational view, looking from the right with respect to FIG. 1.
Figure 3:
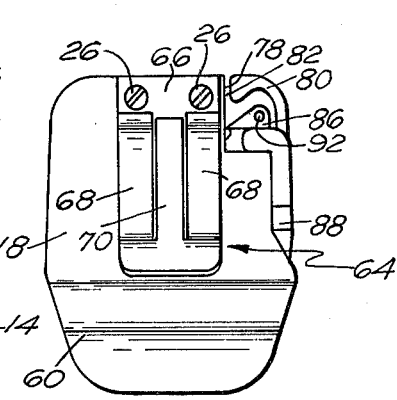
FIG. 3 is a rear side elevational view thereof.
Figure 9:
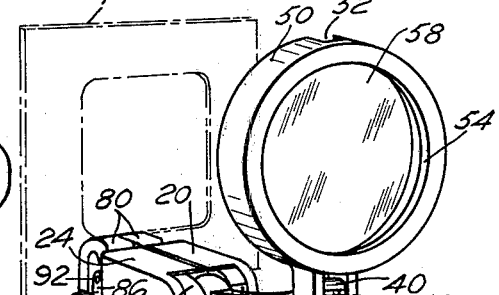
FIG. 9 is a perspective view illustrating the holder in operative position for viewing a card or slide frictionally held by the holder.
Figure 11:
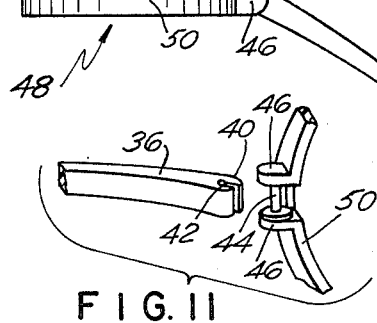
FIG. 11 is a fragmentary perspective showing the means for attaching the lens frame to the pivot arm.

As will be seen most clearly in FIGS. 2 and 9, side walls 18 and 22 each have an integral inwardly extending ring-like portion 30, having aligned open portions 32. The ring portions 30 cooperate with each other when the halves 14 and 16 are assembled to define a socket for receiving ball portion 34 integrally carried by elongated pivot arm 36. It will thus be seen that the socket defined by ring portions 30 forms a universal swivel joint with ball 34 while the aligned open portions 32 permit sidewise pivoting movement of arm 36 when said arm is aligned with said open portions, as illustrated in FIG. 9.

It will be noted that the diameter of ball 34 is sufficiently large so that when the halves 14 and 16 are secured to each other by screws 26, a small space 38 will exist between adjacent edges of top walls 20 and 24. This permits the friction on ball 34 to be adjusted by tightening or loosening these screws 26 so that a proper frictional drag exists when ball 34 is rotated within said socket.

At its opposite extremity, the pivot arm 36 is provided with a rounded portion 40 having a slot 42 extending therein. The slot 42 is adapted to snap-receive pintle 44 extending between ears 46 which integrally extend from circular frame member 48, thus establishing a pivotal interconnection between frame 48 and arm 36. Frame 48 specifically comprises a peripheral wall 50 having a notch 52 formed therein diametrically opposed from the lugs or ears 46. The width of notch 52 is such that said notch will snugly receive the arm 36 when the frame 48 is pivotally moved with respect to the arm so as to fold thereagainst. Peripheral wall 50 further has an inwardly extending flange 54 against which a magnifying lens is adapted to seat, there being integral detents 56 provided on the innner surface of wall 50 for snap-mounting the lens 58 between said detents and said flange 54. It will thus be seen that the lens 58 may easily be inserted in the frame 48 simply by forcing the lens into said frame beyond said detents 56 whereupon said lens is snap-mounted against flange 54. By the same token, the frame 48 is easily pivotally assembled to arm 36 simply by forcing pintle 44 into slot 42 until the pintle snap-seats therein.

Figure 8:
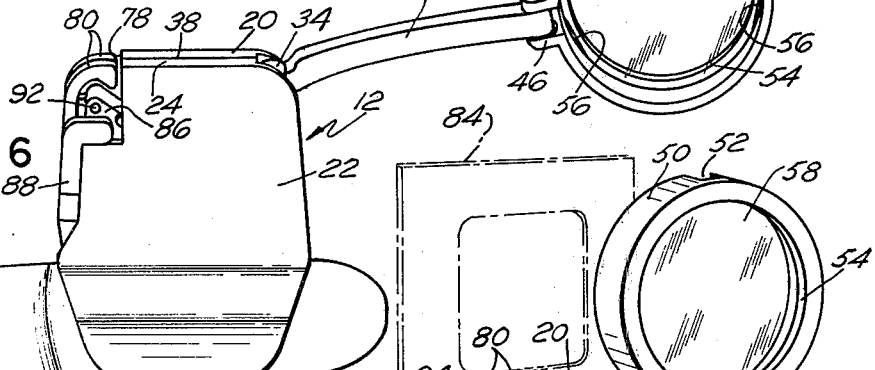
FIG. 8 is a perspective view illustrating the holder in operative position on the user's finger.

As will be seen most clearly in FIG. 9, the lower portions of walls 18 and 22 are each provided with oppositely disposed curved portions 60 having integrally formed ribs 62 on the inner surface thereof. The oppositely disposed curved portions 60 thus function as a resilient clamp for grippingly receiving a user's finger, as illustrated in FIG. 8, although it will be understood that the portions 60 could also be grippingly mounted on a pen, flashlight or the like. The ribs 62 function as treads for minimizing undesirable slippage or movement of the case 12 with respect to the member on which it is mounted. With the case 12 clamped on a user's finger, as illustrated in FIG. 8, the pivot arm 36 may be manipulated and moved to any desired position relative to the case 12, and likewise the frame 48 may be pivoted to any desired position relative to arm 36 to permit the desired positioning of magnifying lens 58.

Figure 7:
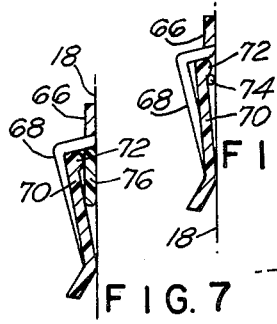
FIG. 7 is a sectional view showing the clip member which forms a part of the present invention in engagement with a relatively wide, flat temple bar.

Secured to the outer surface of one of the side walls, as by the screws 26, is a clip member 64, said clip member having a flat top portion 66 which receives the screws 26 and from which integrally extends a pair of spaced arms 68, said arms extending outwardly and then downwardly and inwardly, as illustrated most clearly in FIG. 2. Integrally extending from the bottom portion of clip member 64 is a tongue 70 having a beaded portion 72 at its upper free extremity. It will be understood that clip 64 resiliently bears against the side wall of the case 12 on which it is mounted, whereby the case 12 may be conveniently clipped to a user's pocket. By the same token, the upwardly extending resilient tongue 70 bears more tightly against the side wall and is adapted to receive therebeneath the temple bar of a pair of eyeglasses. More specifically, in FIG. 6 a wire temple bar 74 is securely positioned beneath tongue 70 and specifically is snugly received just below bead 72. This tends to effect a relatively secure mounting of case 12 on the wire temple bar 74. On the other hand, if the temple bar is of a relatively wide type, as illustrated at 76 in FIG. 7, then the flat bar 76 is resiliently engaged by the entire upper portion of tongue 70. It will be understood that when mounted on the temple bar of a user's eyeglasses, the pivot arm 36 and frame 48 are again adjusted so as to be properly positioned with respect to the eye of the user.

As will be seen most clearly in FIGS. 1 and 8, the top wall of case 12 is cut away to define a shoulder 78. The casing halves 14 and 16 each carry a fixed finger member 80, which finger members curve around and terminate in spaced relation to shoulder 78 to provide a slot 82 therebetween. The slot 82 functions to resiliently and grippingly receive a flat card or slide, such as illustrated at 84 in FIG. 9, it being understood that the card or slide 84 is simply frictionally forced downwardly into slot 82 whereupon the card or slide is supported in upright position with respect to the top wall of case 12, as illustrated in FIG. 9. Once again, proper manipulation of arm 36 and frame 48 permits the magnifying lens to properly align with the card or slide 84 for convenient viewing of the latter by the user.

Figure 4:
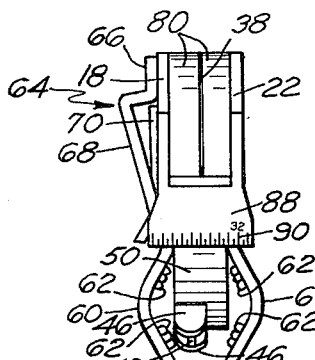
FIG. 4 is an end elevational view, looking from the left with respect to FIG. 1.
Figure 5:
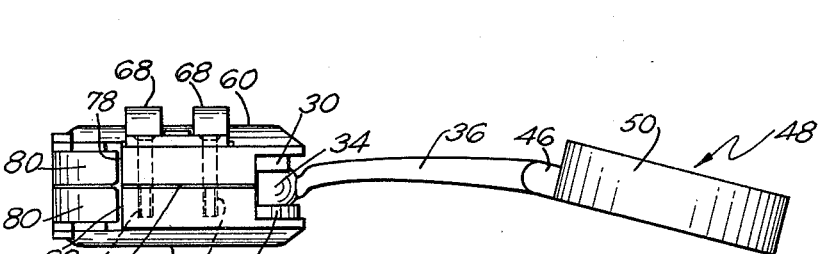
FIG. 5 is a top plan view with the magnifying lens in extended position.
Figure 10:
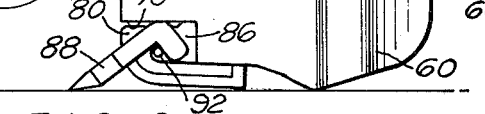
FIG. 10 is a side elevational view showing the pivotal support member associated with the assembly in operative position for maintaining the assembly upright on a flat surface.

Just below the fingers 80 there is provided a fixed portion 86, the opposite side walls of which pivotally carry a supporting foot member 88, the free outer edge of which is provided with graduated calibrations 90, see FIG. 4. In FIGS. 1, 8 and 9, the supporting foot member 88 is shown in its inoperative position. When, however, it is desired to support the case 12 on its side edge on a flat surface, as illustrated in FIG. 10, the supporting foot member 88 is swung to its open or operative position, whereupon said member maintains the case 12 from tipping, even though the case is not manually held. An integral detent 92 is provided on the opposite side walls of portion 86, whereupon when foot member 88 is swung to its open or operative position, as illustrated in FIG. 10, said foot member will frictionally override said detent until the position of FIG. 10 is reached, whereupon the detent will releasably hold the foot member 88 in its operative position. When so positioned, it will be understood that calibrations 90 are exposed for viewing through lens 58 in the event it is desired to use foot member 88 as a measuring device.

It will be understood that when the assembly 10 is not in use, frame 48 is swung with respect to arm 36 until the latter engages within notch 52, in which position the frame 48 is folded snugly against arm 36. Arm 36 is then rotated about its own axis until frame 48 is in alignment with the space between the side walls 18 and 22, at which point the arm 36 with the frame 48 folded thereagainst may be conveniently swung within the casing 12 so as to be completely enclosed thereby, as illustrated in FIGS. 1 and 2. The casing 12 may then be conveniently carried in one's pocket, or, if preferred, may be clipped to one's pocket by means of resilient clip 64. When it is desired to use the magnifying lens 58, the procedure is reversed, i.e., the arm 36 and frame 48 are swung outwardly from casing 12, and then the frame is pivoted with respect to arm 36 until it assumes the desired relative position therewith. The arm 36 may then be swiveled about ball joint 34 until any desired position is achieved, and likewise frame 48 may be pivoted with respect to arm 36 to assume a desired position, depending on the particular usage to be effected. In other words, if the assembly 10 is to be used to view a flat card or slide, as illustrated in FIG. 9, then the frame 48 will normally be pivoted so as to extend upwardly from arm 36, as shown in FIG. 9. On the other hand, if the assembly 10 is to be used to view something mounted on a table top or other flat surface, then supporting foot member 88 is swung to its operative position, as illustrated in FIG. 10, and then arm 36 and frame 48 are positioned so that the latter is disposed in substantially parallel disposition to the flat surface on which the assembly 10 is positioned. Conversely, if the assembly 10 is to be clamped onto a user's finger, or onto a user's eyeglasses, the arm 36 and frame 48 will once again be manipulated until lens 58 is properly positioned for convenient viewing by the user.

As will be obvious, the assembly 10 is economically feasible to manufacture, since virtually all components comprise parts which readily lend themselves to molding of lightweight plastic. The assembly of the parts is likewise extremely simple, involving parts which for the most part snapseat together, the only fastening means required being the two screws which secure the two halves of the casing to each other and at the same time secure clip 64 to the casing.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A magnifying lens holder assembly comprising a frame in which said lens is mounted, an elongated arm pivotally connected at one end to said frame, a case for receiving said frame and arm assembly, said case comprising a pair of spaced side walls interconnected by a top wall but otherwise substantially open at its side and bottom edges, means defining a socket located at one end of said top wall, a ball member at the other end of said arm swivelly received by said socket, whereby when said assembly is not in use, said frame may be pivoted so as to fold against said arm, and then said arm and frame may be swung about said ball and socket to a position wherein said arm and frame are enclosed within said walls, said side walls having oppositely disposed gently curved portions at their lower extremity for resiliently and clampingly receiving the user's finger.

2. In the assembly of claim 1, the other end of said top wall being cut away to define a shoulder, and a finger member extending integrally from said side walls into adjacent spaced relation with said shoulder, said finger member and said shoulder defining a resilient clamp for slidably receiving flat articles, such as cards and the like.

3. In the assembly of claim 1, said top wall comprising two identical sections, each section having one of said side walls depending therefrom and each section carrying a part of said socket, means securing said sections together to complete the assembly, the diameter of said ball member being slightly larger than that of said socket, whereby a frictional drag is imparted on said ball member as the latter rotates within said socket.

4. In the assembly of claim 3, said securing means comprising screws, whereby tightening of said screws correspondingly increases the frictional drag on said ball member.

5. In the assembly of claim 1, a supporting foot member pivotally connected to said case adjacent the other end of said top wall, said foot member being movable between a retracted inoperative position and an extended operative position wherein said case may be positioned on its adjacent side edge on a flat surface without tipping.

6. In the assembly of claim 5, said foot member having calibrations on its top edge.

7. In the assembly of claim 5, integral detent means on said case for releasably retaining said foot member in its inoperative position.

8. In the assembly of claim 1, a clip member secured to the outer surface of one of said side walls, said clip member comprising an elongated curved arm making resilient engagement with said side wall adjacent the free extremity of said arm, and a resilient tongue integrally formed in said arm and extending reversely from a point adjacent said free end, said tongue being substantially straight and having a bead on its inner surface adjacent the free end of said tongue.

9. In the assembly of claim 1, the pivotal connection between said arm and said frame comprising releaseable snap-on connection.

* * * * *